(12) United States Patent
Kikuchi

(10) Patent No.: US 8,472,807 B2
(45) Date of Patent: Jun. 25, 2013

(54) OPTICAL FIELD TRANSMITTER AND OPTICAL TRANSMISSION SYSTEM

(75) Inventor: Nobuhiko Kikuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 249 days.

(21) Appl. No.: 13/131,524

(22) PCT Filed: Nov. 16, 2009

(86) PCT No.: PCT/JP2009/069674
§ 371 (c)(1),
(2), (4) Date: May 26, 2011

(87) PCT Pub. No.: WO2010/061784
PCT Pub. Date: Jun. 3, 2010

(65) Prior Publication Data
US 2011/0236033 A1    Sep. 29, 2011

(30) Foreign Application Priority Data
Nov. 28, 2008 (JP) .................................. 2008-304344

(51) Int. Cl.
*H04B 10/00* (2006.01)
(52) U.S. Cl.
USPC ...................................................... 398/140
(58) Field of Classification Search
USPC ...................................................... 398/140
See application file for complete search history.

(56) References Cited

U.S. PATENT DOCUMENTS

| | | | |
|---|---|---|---|
| 2007/0047972 A1* | 3/2007 | Ikeuchi et al. | 398/207 |
| 2009/0208224 A1* | 8/2009 | Kikuchi | 398/141 |
| 2009/0324247 A1* | 12/2009 | Kikuchi | 398/159 |
| 2010/0021179 A1* | 1/2010 | Kikuchi | 398/183 |
| 2010/0239267 A1* | 9/2010 | Kikuchi | 398/156 |
| 2011/0305457 A1* | 12/2011 | Kikuchi | 398/65 |

FOREIGN PATENT DOCUMENTS

| | | |
|---|---|---|
| CN | 101438517 A | 5/2009 |
| EP | 2 017 980 A1 | 1/2009 |
| JP | 2008-124893 A | 5/2008 |
| WO | WO 2007/132503 A1 | 11/2007 |
| WO | WO 2009/060920 A1 | 5/2009 |

OTHER PUBLICATIONS

Corresponding International Search Report (Form PCT/ISA/210) dated Feb. 23, 2010 with English Translation (Five (5) pages).

(Continued)

*Primary Examiner* — Kenneth N Vanderpuye
*Assistant Examiner* — Abbas H Alagheband
(74) *Attorney, Agent, or Firm* — Crowell & Moring LLP

(57) ABSTRACT

It is provided an optical field transmitter comprising a light source, one or more DA converters, an optical field modulator, a complex information multilevel signal generator circuit, and a phase pre-integration circuit. The optical field modulator modulates light output from the light source into a optical field signal by using the analog signal converted from a complex multilevel information signal including phase pre-integration complex information by the one or more DA converters. A phase angle of the complex multilevel information signal at a complex signal point is any one of values of integral multiples obtained by dividing 360 degrees by a positive integer N. An amplitude value of the complex multilevel information signal at the complex signal point is any one of values of a positive integer M. A total number of the complex signal points which may be taken is lower than a product of N and M.

18 Claims, 14 Drawing Sheets

16QAM signal of the current invention

OTHER PUBLICATIONS

R.A. Griffin et al., "10 Gb/s Optical Differential Quadrature Phase Shift Key (DQPSK) Transmission Using GaAs/AlGaAs Integration"Optical Fiber Conference, 2002, 3 pages, Postdeadline Papers.

Nobuhiko Kikuchi et al., "First Experimental Demonstration of Single-Polarization 50-Gbit/s 32-level (QASK and 8-DPSK) Incoherent Optical Multilevel Transmission", Proc. Optical Fiber Communication Conference (OFC/NFOFC), Mar. 2007, 3 pages, Anaheim, CA.

Jumpei Hongou et al., "1 Gsymbol/s, 64 QAM Coherent Optical Transmission Over 150 km with a Spectral Efficiency of 3 bit/sHZ", Proc. Optical Fiber Communication Conference (OFC/NFOEC), Mar. 2007, 3 pages, Anaheim, CA.

M.G. Taylor, "Coherent Detection Method Using DSP To Demodulate Signal and for Subsequent Equalisation of Propagation Impairments", European Conference on Optical Communication (ECOC), 2003, 2 pages.

* cited by examiner

*prior art*

Definition of amplitude r(n)
and phase φ(n)

Quarternary Phase Shift Keying
(QPSK)

16-level Quarternary Amplitude Modulation
(16QAM)

16-level Amplitude- and
Phase-Shift Keying
(16APSK)

*prior art*

16QAM signal

Phase pre-integrated signal in Fig. 4A

16QAM signal of the current invention

Phase pre-integrated signal of the 16QAM signal in Fig.6A

Other 16QAM signal in the current invention

Other 16QAM signal in the current invention

*prior art*

Number of phase    N=8
Number of amplitude M=2
Number of signal points k=16

Number of phase N=12
Number of amplitude M=2

6-level signal in the current invention

Phase pre-integrated signal of the 6-level signal in Fig. 12A

Number of phase N=6
Number of amplitude M=2

Other 6-level signal in the current invention

Phase pre-integrated signal of the 6-QAM signal in Fig. 12C

Number of phase N=8
Number of amplitude M=2

8-APSK signal in the curren invention
(having maximum amplitude in the square area)

Phase pre-integrated signal of the 8-APSK signal in Fig. 13A

Number of phase
N=8
Number of amplitude
M=1

QPSK signal in the current invention

Phase pre-integrated signal of the QPSK signal in Fig. 13C

Other 8-APSK signal in the current invention

Phase pre-integrated signal of the 8-APSK signal in Fig. 14A

OPTICAL FIELD TRANSMITTER AND OPTICAL TRANSMISSION SYSTEM

BACKGROUND OF THE INVENTION

This invention relates to an optical transmission system, and more particularly, to a configuration of an optical field transmitter suitable for transmission/reception of an optical multilevel signal transmitted via an optical fiber.

The amount of information that can be transmitted (transmission capacity) via one optical fiber has reached capacity of performance of an optical fiber amplifier because a wavelength bandwidth of the optical fiber amplifier has been almost used up owing to an increase in number of wavelength channels and a speedup of a modulation speed of an optical signal. In order to further expand the transmission capacity of the optical fiber, it is necessary to enhance use efficiency of the frequency bandwidth by devising a signal modulation format so that a large number of optical signals are packed in a limited frequency bandwidth.

In the world of radio communications, since 1960s, a multilevel modulation technology has realized transmission at such high efficiency that frequency use efficiency exceeds 10. There have conventionally been many studies of multilevel modulation which is regarded as promising also in the field of optical fiber transmission. For example, Non-patent Document 1 discloses quadrature phase shift keying (QPSK) for performing four-level phase modulation. In addition, Non-patent Document 2 discloses 32-level amplitude and phase modulation that is a combination of four-level amplitude modulation and eight-level phase modulation.

FIGS. 1A to 1D are explanatory diagrams illustrating a signal constellation of various known modulation formats on a complex plane used for the optical transmission. On the complex plane (complex plane, phase plane, IQ plane), there are plotted signal points of the various optical multilevel signals (complex display of an optical field at a decision timing).

FIG. 1A is an explanatory diagram for a signal point on the IQ plane. Each of the signal points may be displayed by complex Cartesian coordinates (IQ coordinates) or polar coordinates represented by an amplitude $r(n)$ and a phase $\phi(n)$ illustrated in FIG. 1A.

FIG. 1B illustrates the four-level phase modulation (QPSK) in which four values (0, /2, π, and −π/2) are used as the phase angle $\phi(n)$ and two-bit information (00, 01, 11, 10) is transmitted per symbol.

FIG. 1C illustrates sixteen-level quadrature amplitude modulation (16QAM) widely used in radio communications. The 16QAM, in which signal points are arranged in lattice, allows four-bit information to be transmitted per symbol. In the example of FIG. 1C, the Q-axis coordinate represents a value of upper two bits (10xx, 113x, 01xx, 00xx), and the I-axis coordinate represents a value of lower two bits (xx10, xx11, xx01, xx00). It is known that in this signal constellation, a distance between the signal points increases to enhance the receiver sensitivity. It is reported that in optical communications, the quadrature amplitude modulation of this type can be realized by using a coherent optical receiver. For example, Non-patent Document 3 reports an experimental example of transmission/reception of a 64QAM signal using the coherent optical receiver. The coherent optical receiver uses a local light source disposed within the receiver in order to detect the phase angle of the optical signal.

Similarly, FIG. 1D illustrates sixteen-level amplitude and phase modulation (16APSK) widely used in radio communications.

Here, description is made of a coherent reception format which is one of conventional technologies for an optical multilevel receiver, for example, a coherent optical field receiver disclosed in Non-patent Document 4. FIG. 2 is a block diagram illustrating a configuration of a coherent optical field receiver of a polarization diversity type, which simultaneously receives information on two polarizations of the optical signal. The optical multilevel signal transmitted through an optical fiber transmission line as an input optical signal 101 is split into a horizontal (S) polarization component 105 and a vertical (P) polarization component 106 by a polarization beam splitter 102-1, which are input to coherent optical field receivers 100-1 and 100-2, respectively.

In the coherent optical field receiver 100-1, a local laser source 103 having a wavelength substantially the same as the input optical signal 101 is used as a reference of an optical phase. Local light 104-1 output from the local laser source 103 is split into two beams of local light 104-2 and local light 104-3 by a polarization beam splitter 102-2, which are input to the coherent optical field receivers 100-1 and 100-2, respectively.

Inside the coherent optical field receiver 100-1, an optical phase diversity circuit (PDC) 107 combines the S polarization component 105 of the input optical signal and the local light 104-2. The optical phase diversity circuit 107 generates an I (inphase) component output light 108 including an inphase component of the local light and the optical multilevel signal, and a Q (quadrature) component output light 109 including a quadrature component of the local light and the optical multilevel signal. Both the I component output light 108 and the Q component output light 109 are received by balanced optical receivers 110-1 and 110-2, respectively. The received optical signals are converted into electrical signals, which are then time-sampled by A/D converters 111-1 and 111-2 to become digitized output signals 112-1 and 112-2, respectively.

In the following description, as illustrated in FIG. 1A, the optical field of the received optical multilevel signal 101 is represented as $r(n)\exp(j\phi(n))$, and the optical field of the local light 104-2 and the local light 104-3 is assumed to be 1 (originally, an optical frequency component is included, but the optical frequency component is omitted). Here, "r" represents an amplitude of the optical field, "φ" represents a phase of the optical field, and "n" represents a sampling number. The local light 104-2 and the local light 104-3 actually have random phase noise and a slight difference frequency component with respect to signal light. However, the phase noise and the difference frequency component exhibit temporally slow phase rotation, and may be eliminated by a digital signal processing. Therefore, the phase noise and the difference frequency component are ignored.

Each of the balanced optical receivers 110-1 and 110-2 performs homodyne detection on the input optical multilevel signal 101 with the local light 104-2, and outputs an inphase component and a quadrature component, respectively, of the optical field of the optical multilevel signal 101 by taking the local light as a reference. Therefore, the electrical signal 112-1 output from the A/D converter 111-1 is represented by Expression (1), and the electrical signal 112-2 output from the A/D converter 111-2 is represented by Expression (2). However, for simplification, constants including a conversion factor are all set to "1".

$$I(n)=r(n)\cos(\phi(n)) \quad (1)$$

$$Q(n)=r(n)\sin(\phi(n)) \quad (2)$$

As described above, the coherent optical field receiver can easily obtain all information pieces indicating the optical field r(n)exp(φ(n)) (both I component and Q component) from the received optical multilevel signal 101, thereby allowing the optical multilevel signal reception.

A digital signal processing circuit 113, which is a complex field signal processing circuit, gives an inverse function to linear degradation (for example, chromatic dispersion) or the like exerted upon the optical signal during transmission, to thereby enable cancellation of influences thereof. Further, processings such as retiming and resampling are performed to output optical field components after the processings, that is, an inphase component 114-1 and a quadrature component 114-2.

As described above, the coherent optical field receiver 100-1 can obtain field information on the S polarization component of the input optical signal 101, but needs to receive the P polarization component as well because a polarization state of the optical signal changes at random during the optical fiber transmission. Therefore, the coherent optical field receiver 100-2 receives the P polarization component of the optical multilevel signal 101 in the same manner, and outputs the field information thereon as output signals 114-3 and 114-4.

A digital signal processing/symbol decision circuit 115 resolves the change of the polarization state by subjecting the above-mentioned I component and Q component of the respective polarizations output from the digital signal processing circuit 113 to conversion of the polarization state. Subsequently, the digital signal processing/symbol decision circuit 115 decides which symbol has been transmitted with high precision by comparing, for example, the signal constellation illustrated in FIG. 1C and the I component and the Q component of the respective polarizations. A decision result thereof is output as a multilevel digital signal 116.

By using the coherent optical field receivers described above, it is possible to obtain all the field information pieces on the received signal, which allows, in principle, any complicated multilevel signal to be received. However, the above coherent optical field receiver suffers from such a problem that the configuration of the receiver is extremely complicated and expensive. That is, there is a problem, among others, that because a local light emission source is disposed within the receiver, and a diversity configuration that receives both polarizations of S and P is provided, the scale of the receiver is doubled or more.

On the other hand, FIG. 3 is a block diagram illustrating a configuration of a phase pre-integration optical multilevel signal transmission system previously proposed by the inventors of this invention, which addresses the problem to be solved by the invention. This system easily realizes the optical multilevel transmission using optical delay detection with no local light emission source.

An unmodulated laser beam output from a laser source 210 is input to an optical field modulator 211 within a phase pre-integration optical field transmitter 200, and an optical field signal 213 subjected to required electric field modulation is output from an output optical fiber 212. An information signal to be transmitted is input to a digital information input terminal 201 as a parallel (for example, m-bit width) binary high-speed digital electric signal string. The input signal is converted into a complex multilevel information signal 203 within a complex multilevel signal generator circuit 202. The converted signal is a digital electric multilevel signal represented as (i, q) on a two-dimensional IQ plane, and a real part i and an imaginary part q of the signal are output every time interval T (=symbol time).

The converted signal is input to a phase pre-integration unit 204. The phase pre-integration unit 204 digitally integrates only a phase component of the input signal with the time interval T, to thereby convert the input signal into a phase pre-integration complex multilevel information signal 205. When the input complex multilevel information signal 203 (i, q) is converted into polar coordinates on the complex plane, the signal can be represented by, for example, Expression (3) (j is an imaginary part unit). In this expression, n is a symbol number of the digital signal, r(n) is a symbol amplitude of the digital signal, and φ(n) is a phase angle.

$$Ei(n)=i(n)+jq(n)=r(n)exp(j\phi(n)) \quad (3)$$

In this expression, the phase pre-integrated signal to be output can be represented in polar coordinates by Expression (4).

$$Eo(n)=i'(n)+jq'(n)=r(n)exp(j\theta(n))=r(n)exp(j\Sigma\phi(n)) \quad (4)$$

In this expression, θ(n) is a phase angle of the output signal, and Σφ(n) is a value obtained by accumulating past phase angles φ(1) . . . φ(n).

The output signal is again converted into a Cartesian coordinate system, and then output as the phase pre-integration complex multilevel information signal 205. This signal is input to the sampling speed conversion circuit 206, and complements the sampling points so that the sampling speed becomes 2 samples/symbol or more. As a result, the Nyquist theorem is satisfied, and complete field equalization is enabled. Thereafter, an inverse function of degradation developed in an optical transmission line 214 by a preequalization circuit 207 is applied to the phase pre-integration complex multilevel information signal, and then divided into a real part i" and an imaginary part q". The divided signals are converted into high-speed analog signals by respective DA converters 208-1 and 208-2.

Those two analog signals are amplified by driver circuits 209-1 and 209-2, and then input to two modulation terminals I and Q of the optical field modulator 211. As a result, the optical field signal 213 can be generated with the preequalization phase integrated signals (i"(n), q"(n)) in the in-phase component I and the quadrate component Q of the optical field. The optical field of the optical field signal 213 is (i"(n)+jq"(n))esp(jω(n)), and ω(n) is an optical angular frequency of the laser source 210. That is, the optical field signal 213 is (i"(n), q"(n)) in the vicinity of the equalization low band where the optical frequency component is removed.

The optical field signal 213 is transmitted through the optical fiber transmission line 214, subjected to transmission degradation by chromatic dispersion of the optical fiber, and thereafter input to an incoherent optical field receiver 22 as a received optical field signal 221. The transmission degradation is mutually canceled by the inverse function applied by the preequalization circuit 207 in advance, and therefore the optical field of the receive signal is equal to the phase pre-integration complex multilevel information signal 205.

The received optical field signal 221 is split into three optical signal paths by an optical splitter 222. The split optical signals are input to a first optical delay detector 223-1, a second optical delay detector 223-2, and an optical intensity detector 225. The first optical delay detector 223-1 is set so that one delay time Td of two optical paths is substantially equal to a symbol time T of the received optical multilevel information signal, and so that a difference of optical phase between the optical paths becomes 0. Further, the second optical delay detector 223-2 is set so that one of two paths has a delay time Td=T, and so that an optical differential phase between those paths becomes π/2.

Two output lights of the first and second optical delay detectors 223-1 and 223-2 are converted into electric signals by balanced optical detectors 224-1 and 224-2, respectively. Thereafter, the converted electric signals are converted into digital signals dI(n) and dQ(n) by A/D converters 226-1 and 226-2, respectively. Further, an electric signal output from the optical intensity detector 225 is also converted into a digital signal P(n) by an AD converter 226-3.

Thereafter, the digital signals dI(n) and dQ(n) are input to an inverse tangential circuit 227. The inverse tangential circuit 227 conducts inverse tangent operation of two arguments with dI(n) as an X component and dQ(n) as a Y component, and calculates an phase angle of the digital signals dI(n) and dQ(n).

When the optical field of the received optical field signal 221 is described as r(n)exp(jθ(n)), dI can be represented by Expression (5) on the basis of the principle of the optical delay detection.

$$dI=r(n)r(n-1)\cos(\Delta\theta(n)), dQ=r(n)\sin(\Delta\theta(n)) \quad (5)$$

In this expression, $\Delta\theta(n)$ is a differential phase $(\theta(n)-\theta(n-1))$ from a symbol immediately before a received n-th optical field symbol. Because dI and dQ are a sine component and a cosine component of $\Delta\theta(n)$, respectively, the inverse tangential circuit 227 conducts inverse tangential (arc tan) operation of four quadrants so as to calculate $\Delta\theta(n)$.

In this configuration, because the phase preintegration is conducted at the transmit side as described above, a phase angle of the received optical field signal can be represented by Expression (6).

$$\theta(n)=\Sigma\phi(n) \quad (6)$$

Hence, an output signal of the inverse tangential circuit 223 can be represented by Expression (7), and a phase component $\phi(t)$ of the original complex multilevel information signal 203 can be extracted.

$$\Delta\theta(n)=\Sigma\phi(n)-\Sigma\phi(n-1)\phi(n) \quad (7)$$

On the other hand, an output signal P of the optical intensity detector is input to a square root circuit 228 so as to obtain an original electric field amplitude represented by Expression (8) as an output.

$$r(n)=sqrt(P(n)) \quad (8)$$

For that reason, the obtained amplitude component r(n) and phase component $\phi(n)$ are input to a Cartesian coordinate converter circuit 229 so as to reproduce an original digital electric multilevel signal 230 represented by Expression (9) from a reproduced complex information output terminal 225.

$$(i,q)=r(n)exp(\Delta\theta(n)) \quad (9)$$

FIGS. 4A and 4B are explanatory diagrams of signal constellation in the phase preintegration transmission system.

For example, as the complex multilevel information signal 203 in FIG. 3, a 16QAM signal illustrated in FIG. 4A can be used. The 16QAM signal has 16 signal points a to p in the figure, and the respective points can be represented by Expression (10) as described above.

$$Ei(n)=r(n)exp(j\phi(n)) \quad (10)$$

Those signal points are generated in a random order, and hence the phase integrated signal of the 16QAM signal has triple concentric circles having various phase angles $\Sigma\phi(n)$ as illustrated in FIG. 4B. This is because in the phase integrated signal, the signal points of the original 16QAM signal have three amplitude levels (outermost peripheral points (a, d, m, p), intermediate points (b, c, h, l, o, n, e, i), and innermost peripheral points (f, g, k, j)).

FIG. 5 is a block diagram illustrating configurations of the complex multilevel signal generator circuit 202 and the phase pre-integration unit 204 in the conventional phase pre-integration optical field transmitter 200 of FIG. 3 in more detail.

The complex multilevel signal generator circuit 202 allocates a complex multilevel information signal to the input binary high-speed digital signal string of the m-bit width. For example, in the case of m=4 bits, the information signal has 2^4=16 states. For that reason, the complex multilevel signal generator circuit 202 allocates an input signal to any one of 16 points a to p of FIG. 4A, and outputs the Cartesian coordinates (i, q) as the complex multilevel information signal 203. The complex multilevel information signal 203 is input to a polar coordinate converter circuit 240 in the phase pre-integration unit 204, and converted into an amplitude information signal 241 represented by Expression (11) and a phase information signal 242 represented by Expression (12).

$$r(n)=sqrt(i^2+q^2) \quad (11)$$

$$\phi(n)=arctan(q,i) \quad (12)$$

Subsequently, the phase information signal 242 is input to a phase pre-integration circuit 243. The phase pre-integration circuit 243 includes a delay circuit 249 with a delay time T and an adder circuit 248. The phase pre-integration circuit 243 repeats the operation of adding the input digital phase signal $\phi(n)$ to an integrated value $\Sigma\phi(n-1)$ delayed by a time T to repeat the operation of obtaining the integrated phase 244 $(\Sigma\phi(n))$. Then, a phase pre-integration information signal 245 of polar coordinates which is new complex information having the amplitude value r(n) as the amplitude component and the phase integrated value $\Sigma\phi(n)$ as the phase component is configured. Thereafter, this signal is input to a Cartesian coordinate converter circuit 246, and again converted into a phase pre-integration information signal 247 (i', q') of the Cartesian coordinate display.

Non-patent Document 1: R. A. Griffin, et. al., "10Gb/s Optical Differential Quadrature Phase Shift Key (DQPSK) Transmission using GaAs/AlGaAs Integration," OFC2002, paper PD-FD6, 2002

Non-patent Document 2: N. Kikuchi, K. Mandai, K. Sekine and S. Sasaki, "First experimental demonstration of single-polarization 50-Gbit/s 32-level (QASK and 8-DPSK) incoherent optical multilevel transmission," in Proc. Optical Fiber Communication Conf. (OFC/NFOEC), Anaheim, Calif., Mar. 2007, PDP21.

Non-patent Document 3: J. Hongou, K. Kasai, M. Yoshida and M. Nakazawa, "1 Gsymbol/s, 64 QAM Coherent Optical Transmission over 150 km with a Spectral Efficiency of 3 Bit/s/Hz," in Proc. Optical Fiber Communication Conf. (OFC/NFOFEC), Anaheim, Calif., Mar. 2007, paper OMP3.

Non-patent Document 4: M. G. Taylor, "Coherent detection method using DSP to demodulate signal and for subsequent equalization of propagation impairments," paper We4.P.111, ECOC 2003, 2003

SUMMARY OF THE INVENTION

A first object to be solved by this invention is an increase in a signal throughput within a transmitter in the phase pre-integration optical field transmission system proposed up to now. As described above with reference to FIG. 5, the phase pre-integration processing can be realized by a simple addition processing by converting the complex multilevel signal generated in the Cartesian coordinate into the polar coordinate system once, and separating and extracting only the phase component.

However, in this configuration, the signal processing circuits such as the polar coordinate converter circuit 240, the phase pre-integration circuit 243, and the Cartesian coordinate converter circuit 246 are increased. Such increase in the circuit scale excessively consumes the number and area of ICs or processors which are hardware for executing operation, and increases a clock speed for determining an operation speed, as well as increases heating, power consumption, volume, and size of the transmitter. Therefore, the increase in the circuit scale is not desirable.

The circuit scale of the operation and the signal throughput are determined by not only the number of operation blocks described above as well as the amount of information to be processed. For example, in the 16-level QAM signal (four levels of each of I and Q) illustrated in FIG. 4, the throughput of the signal is originally m=4 bits (2 bits in each of I and Q), and if arithmetic processing such as pre-equalization of chromatic dispersion is executed, the optical field needs to be more finely resolved to improve the precision.

For example, the optical field is resolved in each direction of the IQ axis by about 6 bits, that is, the optical field is further finely resolved in 64 levels to execute the arithmetic processing. Then, the complex multilevel information signal 203 and the phase pre-integration information signal 247 in the Cartesian coordinate expression in FIG. 5 need to be dealt with as binary digital signals of 6-bit width for each of i and q, and the amount of operation of the above-mentioned processing circuit that computes those signals is increased by triple or more.

A second problem to be solved by the invention is deterioration of the operation precision. The polar coordinate converter circuit 240 and the Cartesian coordinate converter circuit 246 conduct nonlinear operation, and when nonlinear operation is executed with the same resolution as that of the linear operation, processing omission occurs, and the operation precision is deteriorated. The deterioration of the operation precision deteriorates the precision of the output optical field signal, and causes various disadvantages such as a reduction in transmission distance due to the degradation of the OSNR sensitivity of the optical signal or the deterioration of the preequalization performance.

In general, in order to maintain the calculation precision before and after the nonlinear operation, it is known that the number of operation bits is desirably further increased. For example, if the internal operation throughout is 8 bits, the polar coordinate converter circuit 240, the Cartesian coordinate converter circuit 246, and the phase pre-integration circuit 243 need to execute the arithmetic processing of the 8-bit width and the table lookup processing, many problems occur such as an increase in the circuit scale, an increase in the number of input/output pins in the IC circuit, an increase in a wiring space, and an increase in the costs.

Further, because an upper limit is provided for the output range of the balanced receiver and the AD converter used in the multilevel receiver, if the signal constellation is improper, the output amplitude of the signal is deteriorated, resulting in such a problem that an influence of the electrical noise of the receiver is increased.

A third object of this invention is generation of a timing delay caused by the operation. In the phase pre-integration unit 204 and the complex multilevel signal generator circuit 202, the timing delay (latency) is generated with implementation of the operation, and the timing delay impairs the instantaneousness of the information signal transmission, which is not desirable. Further, a delay circuit for adjusting the timing delay needs to be provided at appropriate portions, leading to a problem that the circuit scale is increased. In particular, operation wide in the bit width and operation including the time feedback are liable to cause the timing delay. In particular, occurrence of the timing delay in the phase pre-integration circuit 243 is problematic.

Under the above circumstances, a first object of this invention is to solve the above first problem, reduce the amount of operation in the phase pre-integration optical field transmission system, reduce the circuit scale, reduce the size and costs of the transmitter, and enhance the practicality.

Further, a second object of this invention is to improve the calculation precision in the phase pre-integration operation without increasing the circuit scale, and prevent the performance in the optical transmission by maximizing the amplitude of the output signal.

Further, a third object of this invention is to prevent occurrence of the operation delay caused by the phase pre-integration operation, and realize the transmitter and receiver with small delay.

A representative aspect of this invention is as follows. That is, there is provided an optical field transmitter comprising: a light source; one or more DA converters; an optical field modulator; a complex information multilevel signal generator circuit that converts an information signal of a plurality of bits input at given time intervals into a complex multilevel information signal to output the complex multilevel information signal; and a phase pre-integration circuit that receives the complex multilevel information signal output from the complex information multilevel signal generator circuit and sampled at the given time intervals, and outputs phase pre-integration complex information obtained by integrating a phase component of the complex multilevel information signal by a given time interval in advance. The one or more DA converters each convert the complex multilevel information signal including the phase pre-integration complex information output from the phase pre-integration circuit into an analog signal, and outputs the converted analog signal to the optical field modulator. The optical field modulator modulates light output from the light source into a optical field signal by using the analog signal, and transmits the modulated optical field signal. A phase angle of the complex multilevel information signal at a complex signal point is any one of values of integral multiples obtained by dividing 360 degrees by a positive integer N. An amplitude value of the complex multilevel information signal at the complex signal point is any one of values of a positive integer M. A total number of the complex signal points that the complex multilevel information signal may take is lower than a product of N and M.

According to the embodiments of this invention, the phase pre-integration operation may be simplified, and an increase in the scale of a digital signal processing circuit within the optical field transmitter may be suppressed.

DETAILED DESCRIPTION OF THE PREFERRED EMBODIMENTS

Figure 1A:
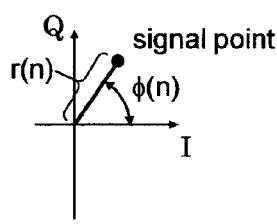
FIG. 1A is an explanatory diagram for illustrating a signal point of modulation method used for an optical transmission on an IQ plane.
Figure 1B:
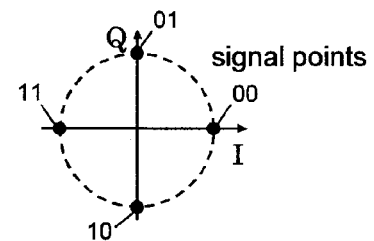
FIG. 1B is an explanatory diagram for illustrating a signal constellation of the four-level phase modulation (QPSK) used for the optical transmission on the IQ plane.
Figure 1C:
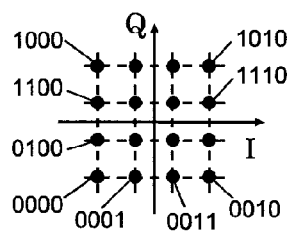
FIG. 1C is an explanatory diagram for illustrating a signal constellation of the sixteen-level quadrature amplitude modulation (16QAM) used for the optical transmission on the IQ plane.
Figure 1D:
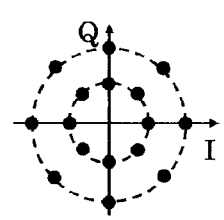
FIG. 1D is an explanatory diagram for illustrating a signal constellation of the sixteen-level amplitude and phase modulation (16APSK) used for the optical transmission on the IQ plane.
Figure 2:
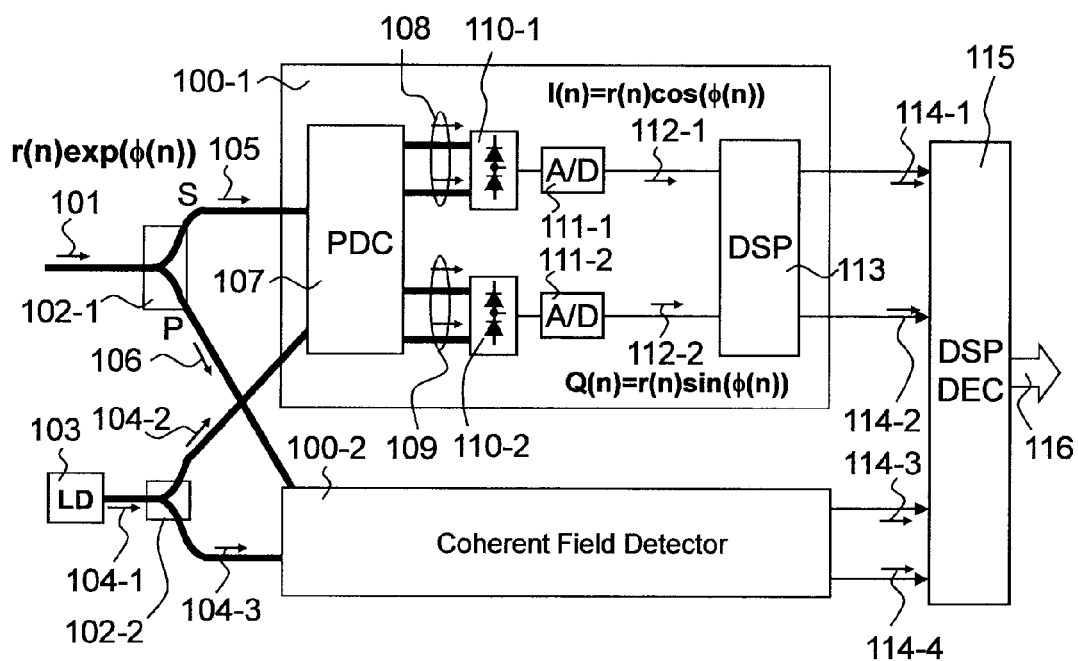
FIG. 2 is a block diagram illustrating a conventional configuration of a coherent optical field receiver of a polarization diversity type.

First, an outline of embodiments according to this invention is described.

The above-mentioned problems to be solved by this invention can be solved by realizing the phase pre-integration circuit by a "modulo N" addition circuit where N is a positive integer, and reducing the hardware scale. If the phase pre-integration circuit is realized by a normal addition circuit, an adder having the number of bits as large as the compensation of the resolution and the nonlinear operation of a DA converter circuit subsequent to the phase pre-integration circuit is required. The number of bits in the adder is typically 6 to 8 bits. On the contrary, if the "module N" addition circuit according to this invention is used, an integral value N can be suppressed to about 6 (expressed by 3 bits) to 32 (corresponding to 5 bits).

The embodiments of this invention have a feature that, in the available complex signal points of the complex information signal, the amplitude is limited to discrete values of integral multiples of (360/N) degrees (N is a positive integer) and the phase angle is limited to M discrete values (M is a positive integer). That is, the number of phases of the phase pre-integrated complex signal is suppressed to N by the "modulo N" addition circuit with the former limit, and the number of amplitudes is suppressed to M with the latter limit. This decreases the total number of signal points of the phase pre-integrated signal, and greatly reduces the amount of operation. That is, the total number of signal points after the phase pre-integration is suppressed to N×M.

In the phase pre-integration technology according to the embodiments of this invention is effective only when the total number K of available complex signal points of the original complex information signal to be transmitted is lower than N×M. The reason is that the number of signal points is not decreased by the phase pre-integration processing and hence K>N×M cannot be satisfied in principle. Further, if K=N×M is satisfied, the signal constellation is not changed by the phase pre-integration processing, and there is no point to apply this processing per se.

Further, among the above-mentioned problems, the reduction in the circuit scale can be achieved by splitting the complex multilevel information signal generated by the complex information multilevel signal generator circuit into an amplitude component and a phase component and outputting the resultant signals, to thereby make unnecessary conversion into the polar coordinates required for the phase pre-integration. In this situation, an increase in the number of signal points of the amplitude component and the phase component is suppressed. In particular, if the phase component is discretized at regular spacings, the increase in the number of signal points before and after the phase pre-integration is suppressed to the minimum so that the input and output wirings can be reduced. Further, even in a quadrature modulation circuit, the signal having the amplitude discretized into M levels and the phase discretized into N levels at the regular spacings is input and output, thereby reducing the circuit scale similarly.

In particular, the "modulo N" addition circuit where N is a positive integer can be easily realized by an N-bit shift register having N phase levels and N phase numbers as the input signal and the output signal. Further, the "modulo N" addition circuit can be also realized by an N-value counter instead of the N-bit shift register. Further, the integer N is suppressed to about several tens, and hence the "modulo N" addition circuit where N is a positive integer can be realized by a memory circuit or a search table with a small hardware scale.

Further, the "modulo N" addition circuit can be realized by extending the function of the "modulo N" addition circuit, and a state transition table with N states that inputs the N phases of the complex multilevel information signal and outputs the N phase values of the phase pre-integrated multilevel electric field signal. Further, the "modulo N" addition circuit can be also realized by a state transition table with N×M states that inputs positional information or a symbol number of the complex multilevel information signal, and outputs positional information or a symbol number of the phase pre-integrated multilevel electric field signal, including the amplitude values in the state transition table. If such a state transition table or a state transition diagram is used, the coordinate information on the phase pre-integrated signal is also stored in the same table, and it is possible to provide also a function of the quadrature modulation circuit disposed at a subsequent stage of the phase pre-integration circuit.

In those pre-integrated signals, the optical field signals are received by the optical delay detection receivers (in particular, a plurality of optical delay detection receivers) at the same time, output signals of the respective optical delay detection receivers are input to the AD converter and converted into digital signals, and the plurality of output digital signals are input to the digital phase processing circuit, and demodulated by two-dimensionally calculating the differential phase from the last symbols, thereby obtaining the original signal constellation. The detection of the two-dimensional differential phase can be realized by, for example, setting the interference phases of two optical delay detectors to 0 and $\pi$, respectively, and conducting the inverse tangent operation of two arguments of the signals output from both the optical delay detectors. Further, the number of optical delay detectors may be increased and the differential phase may be finely set to enhance the detection sensitivity of the differential phase. Further, as occasion demands, the intensity receiver for receiving the amplitude component may be used.

Further, an influence of noise of the receiver can be reduced by constellating the signal points of the complex multilevel signal at rotation angles where the amplitude is maximum within a square area in which a real part and an imaginary part on the complex plane are in a given range (−a to +a, a is a constant).

As described above, this invention can be applied to non-coherent optical fiber transmission of the optical multilevel signal in the optical communication field, in particular, the optical multilevel signal which is high in transmission efficiency where the amplitude and the phase are modulated non-independently. In particular, this invention is applied to the optical field transmitter used for such optical fiber transmission.

According to the embodiments of this invention, the phase pre-integration circuit is realized by the "modulo N" addition circuit where N is a positive integer, specifically a shift register, a memory circuit, or a state transition circuit, to thereby simplify mainly the phase pre-integration operation and remarkably reduce the scale of the digital signal processing circuit within the optical field transmitter. As a result, the operability of the optical field transmitter is improved, the power consumption is reduced, the amount of heat generation is reduced, and the chip area is reduced so as to reduce the cost.

Further, the amplitude of the phase pre-integrated signal is discretized into M levels, and the phase is discretized into N levels so as to reduce the number of symbols after the phase pre-integration to lower than N×M. That is, the expression of the complex multilevel signal and/or the phase pre-integrated signal, which is used for digital operation of the optical field transmitter, can be remarkably simplified. As a result, the amount of wirings and the amount of memory of the circuit used for operation of the information can be reduced. Further, the phase pre-integration operation can be realized by the "modulo N" addition circuit. In particular, the phase value is discretized into 360/N, whereby no quantization error due to a fraction of the phase occurs after the phase pre-integration. Therefore, the positional precision of the signal points can be greatly improved, and the transmission performance of the optical signal (receiver sensitivity or the resistance to waveform distortion) can be improved.

Further, the phase and amplitude are discretized to simplify the phase pre-integration operation, whereby a signal delay in the processing circuit can be reduced to realize the optical transmitter with a small delay.

Further, the signal points are constellated so that the amplitude becomes the maximum in a square area of the complex area (in a square area corresponding to the output range of an electric signal of the receiver). Therefore, the amplitude of the output multilevel signal is maximized so as to reduce the influence of electric noise.

Hereinafter, various embodiments of this invention are described with reference to the drawings.

<First Embodiment>

Figure 8:
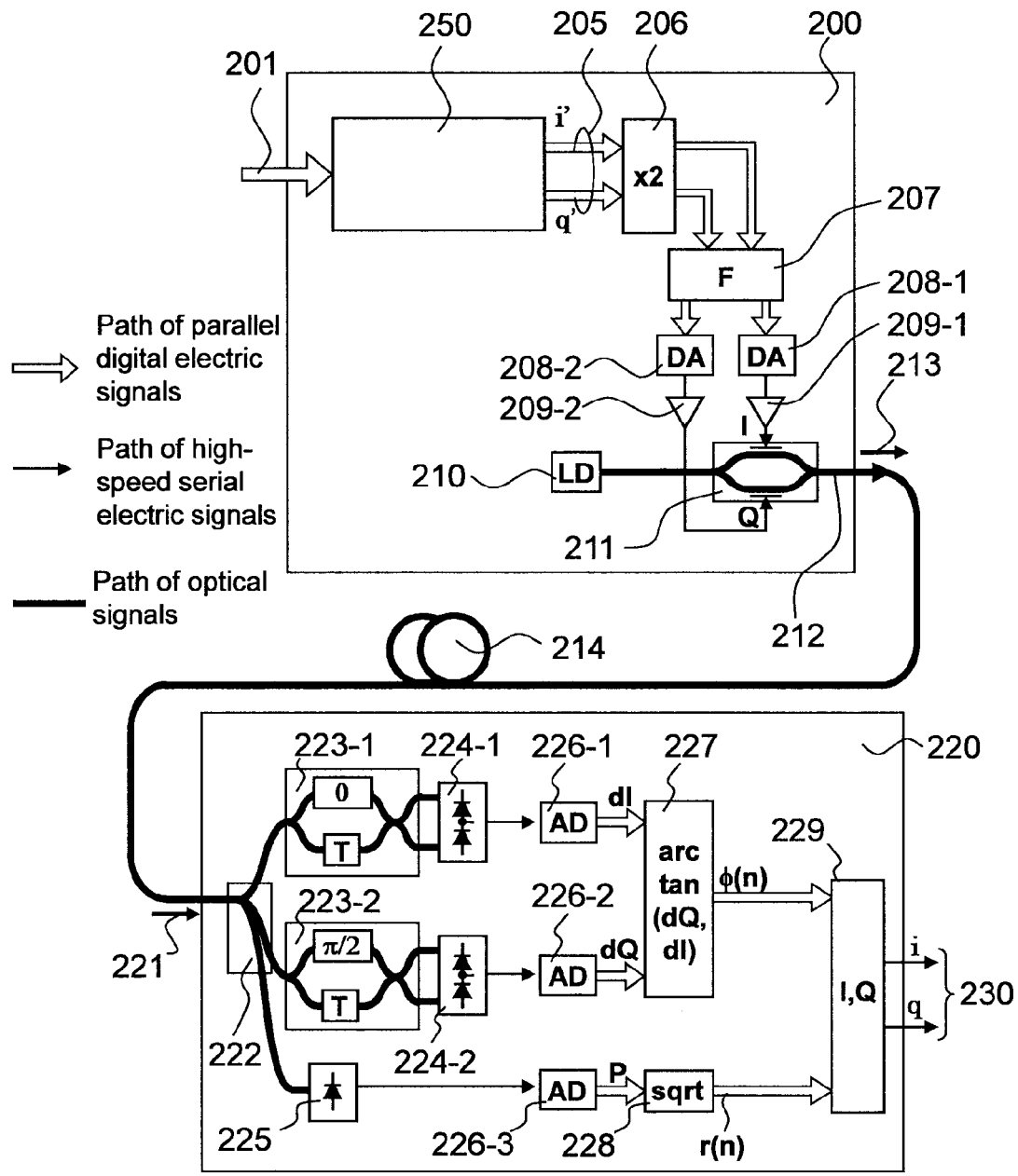
FIG. 8 is a block diagram illustrating a configuration of an optical field transmission system according to this invention, which includes a phase pre-integration optical field transmitter according to the first embodiment of this invention.

FIG. 8 is a block diagram illustrating a configuration of an optical field transmission system according to this invention, which includes a phase pre-integration optical field transmitter 200 according to a first embodiment of this invention. Referring to FIG. 8, a path of an optical signal is indicated by bold lines, a path of an electric signal is indicated by thin lines, and a path of parallel digital electric signals using a plurality of signal wires is indicated by white arrows. A first difference between the configuration illustrated in FIG. 8 and the conventional configuration illustrated in FIG. 3 resides in a phase pre-integration unit 250 in the optical field transmitter 200. The phase pre-integration unit 250 according to this embodiment has the same functions as those of the complex multilevel signal generator circuit 202 and the phase pre-integration unit 204 of FIG. 3.

Figure 3:
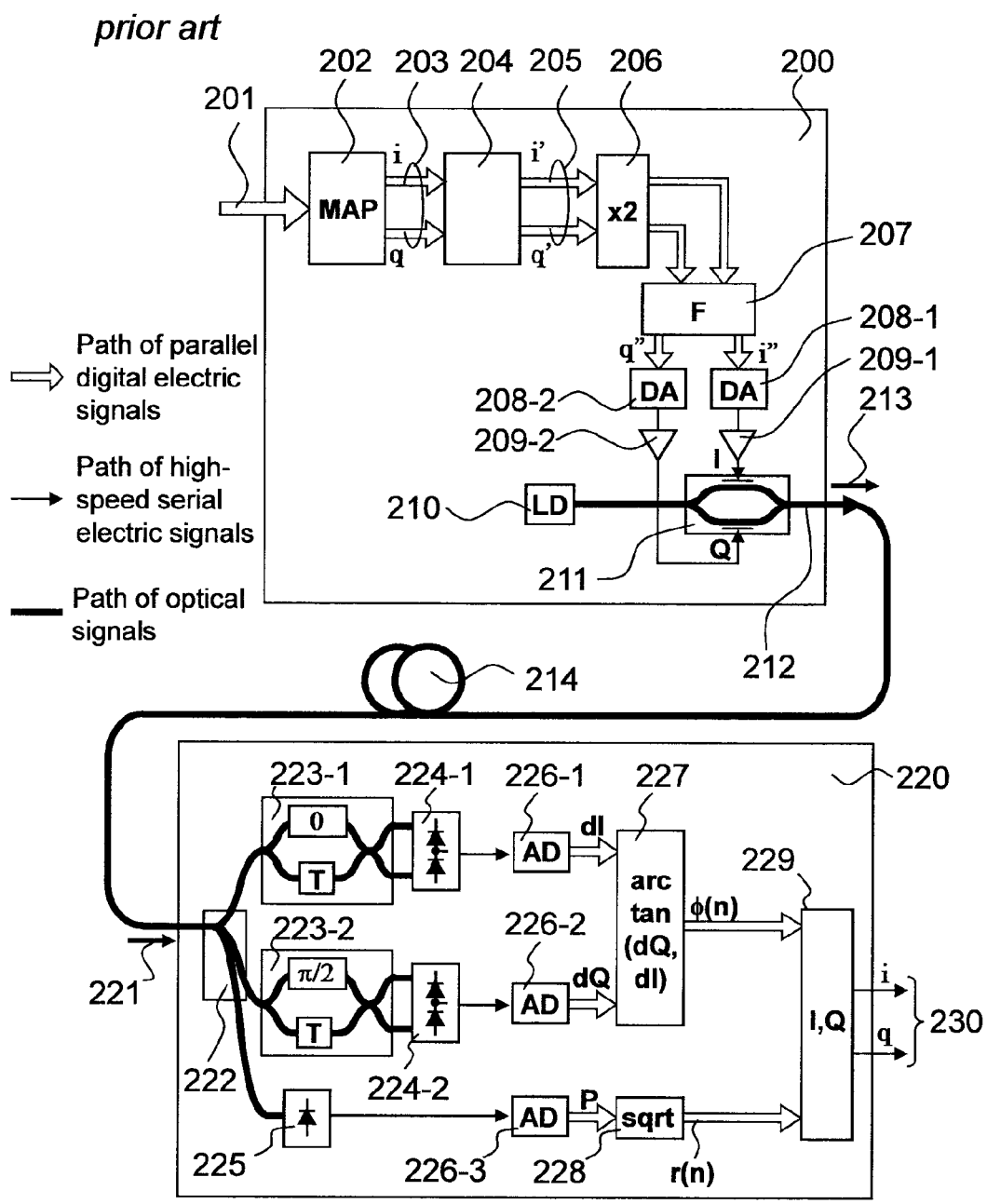
FIG. 3 is a block diagram illustrating a configuration of a phase pre-integration optical multilevel signal transmission system corresponding to the problem of this invention.
Figure 6A:
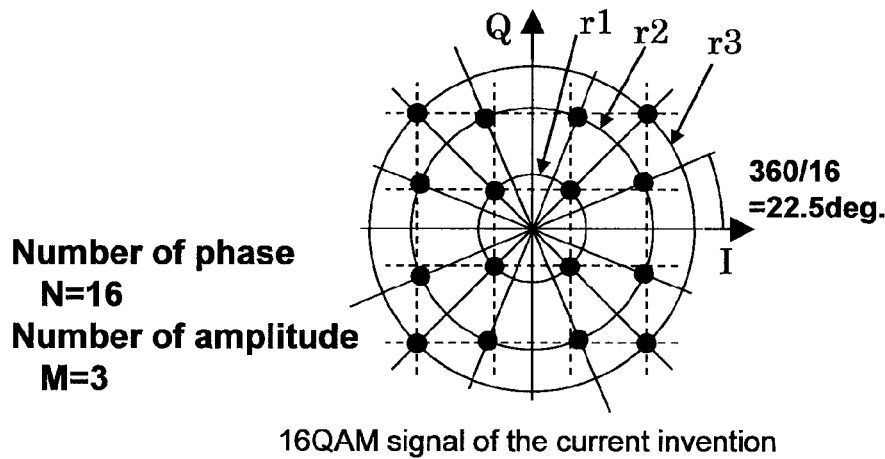
FIG. 6A is an explanatory diagram for illustrating a signal constellation of optical multilevel signal (16QAM signal) according to a first embodiment of this invention.

A second difference between the configuration illustrated in FIG. 8 and the conventional configuration illustrated in FIG. 3 resides in the signal constellation. FIGS. 6A to 6D are explanatory diagrams illustrating signal constellations of the optical multilevel signal proposed by this invention, and FIG. 6A illustrates an example of the 16QAM signal in this invention.

The feature of the signal illustrated in FIG. 6A resides in that the phase angle is divided into 16 pieces on the complex plane, and the signal points are constellated so that the phase angles of all the signal points become integral multiples of 360 degrees/16=22.5 degrees. On the other hand, in the commonly-used signal constellation of the multilevel signal for radio or optical communications such as the conventional signal constellation of QAM illustrated in FIG. 4A, the signal points are constellated so that the receiver sensitivity becomes highest at the maximum spacing of the signal points. That is, in the conventional signal constellation of the multilevel signal, the phase angle is not always 360/N.

Figure 4A:
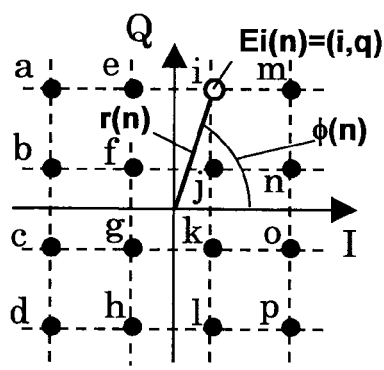
FIG. 4A is an explanatory diagram for illustrating a signal constellation of the optical multilevel signal (16QAM).

In the 16QAM signal illustrated in FIG. 6A of this embodiment, the positions of the signal points are each displaced from the signal constellation of FIG. 4A so that the phase angles of the signal points satisfy the above-mentioned condition (i.e., the signal points are constellated so that the phase angles become integral multiples of 360/N). That is, the original signal points of the 16QAM signal exist at the nodes of the broken lines of FIG. 6A. On the contrary, in this embodiment, radiations dividing 360 degrees into 16 equal parts are drawn about the origin, and concentric circles corresponding to three amplitude levels r1, r2, and r3 of the 16QAM signal are drawn. Then, as for signal points displaced from those nodes of the 16QAM signal (8 points of the amplitude level r2 in this example), nodes of the radiation and the concentric circle closest to the original signal points are selected, and the positions of the signal points are slightly displaced in the circumferential direction so that all the signal points exist on the nodes of the concentric circles and the radiations.

Figure 6B:
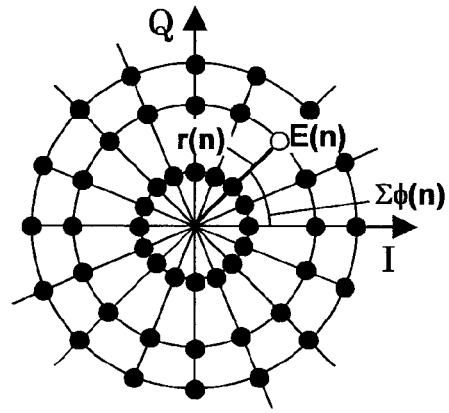
FIG. 6B is an explanatory diagram for illustrating a signal constellation of phase pre-integrated optical multilevel signal illustrated in FIG. 6A.

FIG. 6B illustrates a result of conducting the phase pre-integration processing on the signal points of FIG. 6A of this invention.

Figure 4B:
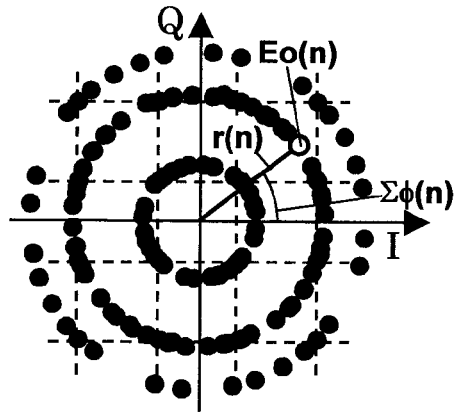
FIG. 4B is an explanatory diagram for illustrating a signal constellation of phase pre-integrated signal of the 16QAM signal.

In the 16QAM signal of FIG. 6A, the amplitude of the multilevel signal is discretized into three levels, and the phase angle is discretized by 360/16 degree unit. As a result, also in the phase pre-integrated signal of FIG. 6B, the amplitude is discretized into three levels at the maximum, and the phase is discretized into 16 levels. As a result, numerous signal points having various phase angles as illustrated in FIG. 4B are prevented from occurring, resulting in such advantages that the operation precision is enhanced and the scale of the processing circuit can be remarkably reduced as described later.

Figure 6C:
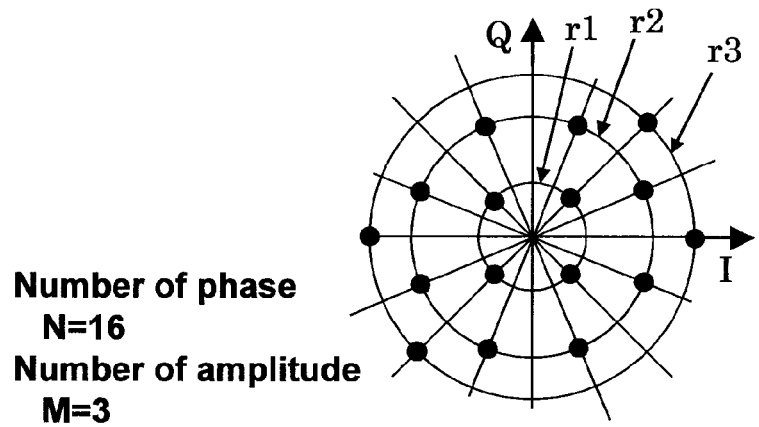
FIG. 6C is an explanatory diagram for illustrating another signal constellation of optical multilevel signal (16QAM signal) according to the first embodiment of this invention.
Figure 6D:
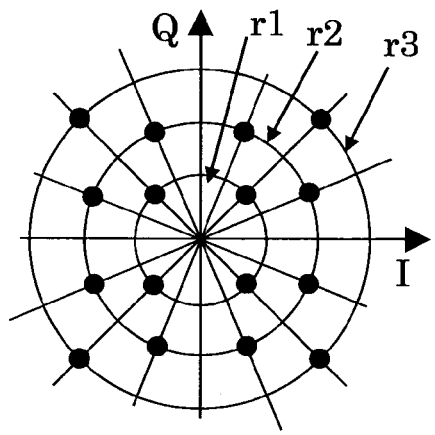
FIG. 6D is an explanatory diagram for illustrating another signal constellation of optical multilevel signal (16QAM signal) according to the first embodiment of this invention.

FIGS. 6C and 6D illustrate other examples of the signal constellation of the 16QAM signal according to this invention.

In this invention, the signal constellation does not always need to be a lattice. As illustrated in FIG. 6C, a signal constellation in which the signal points are constellated at arbitrary nodes can be realized. In this case, the requirements to apply this invention include: (1) all of the signal points are selected from nodes of radiations obtained by equally dividing 360 degrees by an integer N and M concentric circles corresponding to the amplitudes; and (2) the signal points are constellated at only parts of M×N nodes.

In those requirements, the requirement (1) is necessary for reducing the signal processing by keeping the number of signal points after phase pre-integration to the finite minimum number. Further, the condition (2) is necessary for making the significant effect of the phase pre-integration according to this invention. A case in which the condition (2) is not satisfied is that the phase pre-integration, which is a precondition of this invention, is simply meaningless.

Figure 7:
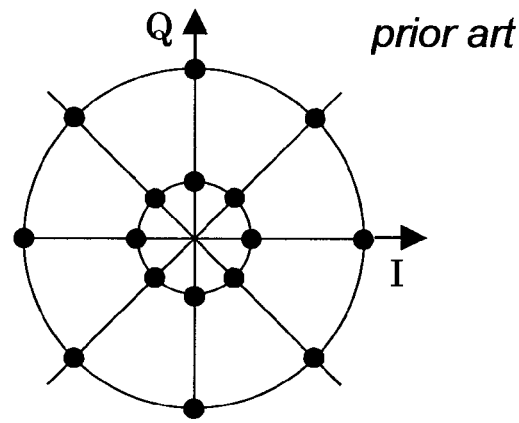
FIG. 7 is an explanatory diagram for illustrating a constellation of a sixteen-level amplitude and phase modulation signal.

For example, a 16-level amplitude phase modulation illustrated in FIG. 7 is an example of a 16-level signal (K=16) in which the signal points are allocated to all points where the number of amplitudes M=2 and the number of phases M=8. In this case, the constellation of the signal points after the phase pre-integration is completely identical with the constellation of the signal points before the phase pre-integration, and the use of the phase pre-integration is meaningless. Accordingly, this invention is not applied to this case.

Further, the signal constellation illustrated in FIG. 6D is an example in which the amplitudes of the signal points of FIG. 6A are changed, with regular spacings of r1 to r3. In this invention, although the phase angle of the signal point is limited to any one of 360/N, the amplitude level is not limited. Therefore, the signal constellation can be varied by changing the amplitude level so as to optimize the transmission characteristics such as the receiver sensitivity and the resistance to the optical fiber nonlinear effect.

<Second Embodiment>

Figure 9:
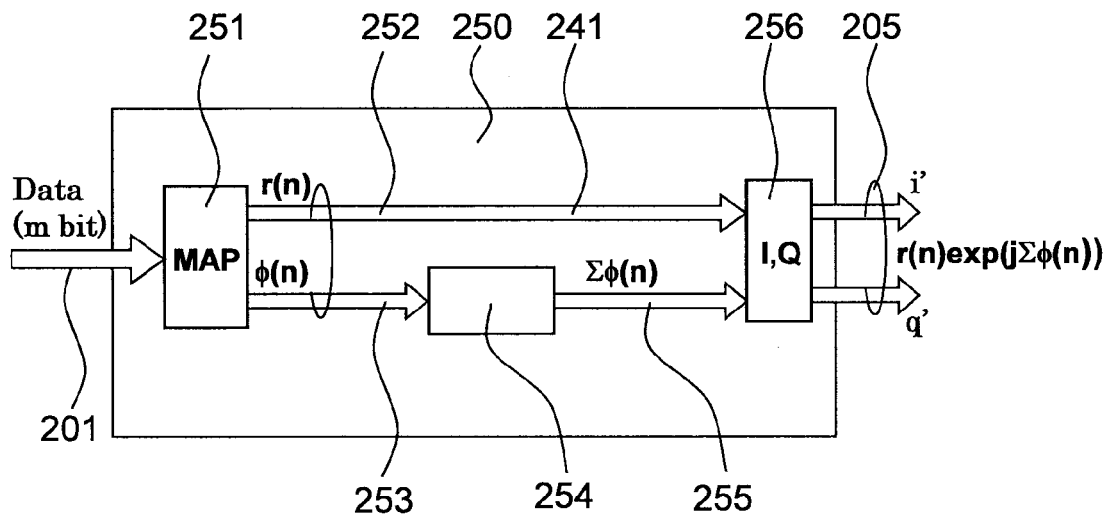
FIG. 9 is a block diagram illustrating configurations of a complex multilevel signal generator circuit and a phase pre-integration unit according to a second embodiment of this invention.

FIG. 9 is a block diagram illustrating configurations of a complex multilevel signal generator circuit 251 and a phase pre-integration unit 250 according to a second embodiment of this invention.

A first feature of the second embodiment resides in that the amplitude is discretized into M levels and the phase is discretized into N levels to greatly decrease the wiring width and the circuit scale.

The complex multilevel signal generator circuit 251 according to this invention receives parallel information signals of m bits from the digital information input terminal 201, and outputs the signals after conversion into a combination of the amplitudes of the M levels and the phases of the N levels, that is, the polar coordinate symbols with the number of states of M×N. For example, if the 16QAM signal illustrated in FIG. 6A is used as a complex multilevel signal, the phase is discretized into N=16 states, and the amplitude is discretized into M=3 states.

Figure 5:
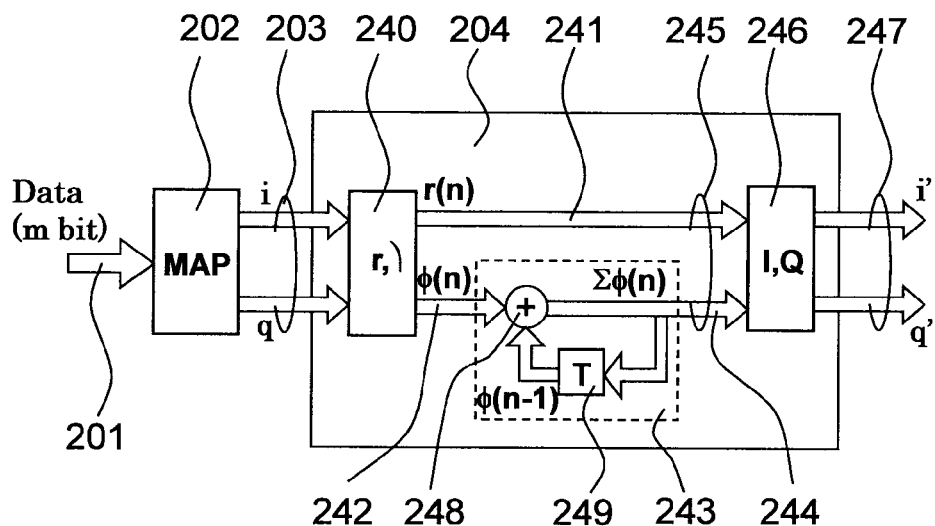
FIG. 5 is a block diagram illustrating configurations of a complex multilevel signal generator circuit and a phase pre-integration unit in more detail.

As a result, the polar coordinate converter circuit 240 in the conventional configuration illustrated in FIG. 5 is not required, and the wire width can be remarkably compressed to 2 bits in amplitude (3 states) and 4 bits in phase (16 states) from 8 bits×2 (assuming two sets of I and Q, and internal 8-bit processing). The same wiring reducing effect is directly applied to the wiring widths of the amplitude information signal 252, the phase information signal 253, and the phase pre-integrated signal 255. Therefore, the large circuit scale reducing effect is obtained as a whole.

Thereafter, the phase information signal 253 with the N states is input to a "modulo N" addition circuit of this embodiment. The addition circuit 254 executes the arithmetic operation of the phase pre-integration.

The "modulo N" addition is mathematic addition in the remainder system of N. An output of an adder circuit that adds a new input signal to the past addition result is limited to 0 to N−1, and if the result of addition exceeds N, the remainder obtained by N division is output. For example, in the "modulo 16" addition, 5+5=10 and 13+5=2 are satisfied.

In this invention, because both of the phase signals before and after addition are limited to the N states, it is possible to use the "modulo N" addition circuit 254, which has a small number of processing bits and a simple configuration as compared with the configuration using the normal adder. For example, in the adder circuit 248 in the conventional configuration illustrated in FIG. 5, an 8-bit adder (adder that adds two sets of 8-bit width numeric values to obtain an 8-bit width output) is required. On the contrary, in the "modulo N" addition circuit according to this embodiment, if the phase has the N=16 states, the "modulo 16" addition circuit can be realized by a 4-bit adder that adds two sets of 4-bit width numeric values to obtain a 4-bit width output. As a result, hardware can be reduced.

Further, in the Cartesian converter circuit 256 according to the second embodiment illustrated in FIG. 9 has a function of inputting the amplitude level with the M states and the phase level of the N states, and outputting the input values after conversion into the Cartesian coordinates. In this invention, because the phase state of the input phase pre-integrated signal is limited to the N levels, the Cartesian converter circuit 256 can largely be reduced in circuit scale.

For example, if the Cartesian converter circuit is realized by a table format, the required amount of memory is about 3,072 bits per one amplitude level in the case of the Cartesian converter circuit 246 in the conventional configuration illustrated in FIG. 5. This is because the phase pre-integrated signal of the input signal has an 8-bit width (256 states), and the output information is 12 bits (2 output signals×6-bit resolution). On the contrary, in this invention, because the phase pre-integrated signal is limited to N=16 states, the required amount of memory is 192 bits per one amplitude level, which can be reduced to a scale of ⅛.

<Third Embodiment>

Figure 10:
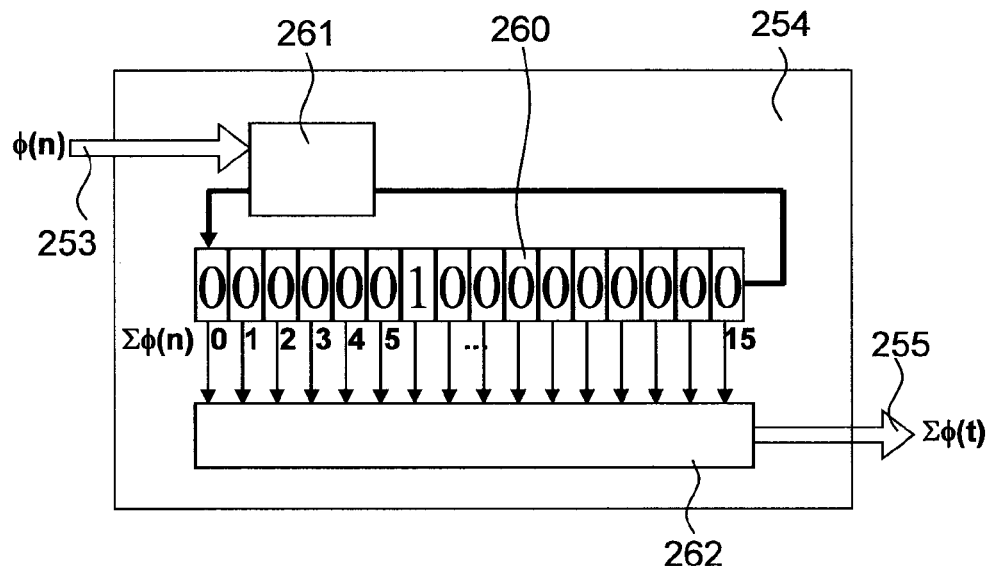
FIG. 10 is a block diagram illustrating a configuration of a "modulo N" phase pre-integration unit using an N-bit shift register according to a third embodiment of this invention.

The "modulo N" addition circuit 254 can be further easily mounted. FIG. 10 is a block diagram illustrating a configuration example of the "modulo N" phase pre-integration unit using an N-bit shift register 260 according to a third embodiment of this invention.

In the N-bit shift register 260, only 1 bit among N bits is set to 1, and the position thereof corresponds to an available value of N (N=16 in this example) of a phase pre-integrated signal Σϕ(n). The output bit of the shift register is returned to a head bit to maintain a state in which only 1 bit is always set to 1. A phase information signal 253 (ϕ(n)) is input to a shift circuit 261, and the bit shift operation of the number corresponding to the values 0 to N−1 is induced. This corresponds to the "modulo N" addition operation.

For example, if five bit shift operations (corresponding to ϕ(n)=5) are conducted in a state where a fifth bit is 1 (Σϕ(n−1)=5), 1 is shifted to a tenth bit (Σϕ(n)=Σϕ(n−1)+ϕ(n)=10). Further, if five bit shift operations (ϕ(n)=5) are conducted in a state where a 13th bit is 1 (Σϕ(n−1)=13), 1 is shifted to a second bit (Σϕ(n)=2). A bit position determination circuit 262 reads the bit position of 1 from the N-bit shift register 260, converts the read position into binary number, and outputs the converted one as a phase pre-integrated signal 255.

In the third embodiment, the N-bit shift register is used as the addition circuit 254. The shift register may be replaced with an N-value counter. The N-value counter is a circuit that receives signals ranging from 0 to N−1 as input signals, accumulatively counts internal count values (0 to N−1) by the number of input signals, and outputs an accumulated result as an output signal. That is, in this embodiment, the addition circuit 254 per se is replaced with the N-value counter. The phase information signal 253 is an input signal of the N-value counter, and the phase pre-integrated signal 255 is an output signal of the N-value counter.

<Fourth Embodiment>

Figure 11A:
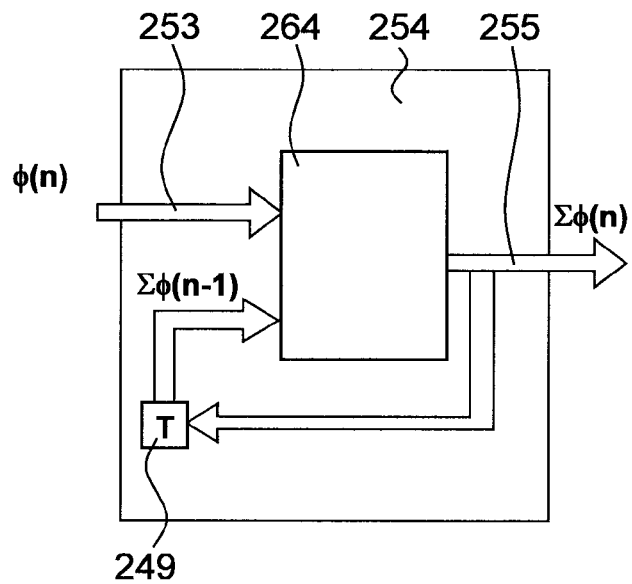
FIG. 11A is a block diagram illustrating a configuration of a "modulo N" addition circuit using an addition lookup table according to a fourth embodiment of this invention.

FIG. 11A is a block diagram illustrating a configuration of the "modulo N" addition circuit 254 using an addition lookup table 264 according to a fourth embodiment of this invention.

In the fourth embodiment, information to be input to the adder circuit is the N-state phase information signal 253 (corresponding to ϕ(n)) and a signal (corresponding to Σϕ(n−1)) obtained by delaying the N-state phase pre-integrated signal 255 by a delay circuit 249. In this invention, because the number of states N is reduced, even if addition is realized by the addition lookup table 264, a required amount of memory is small. As a result, the heated amount, the delay, and the size of the circuit can be reduced.

Figure 11B:
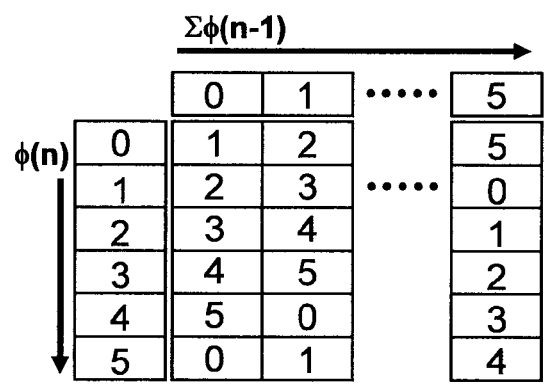
FIG. 11B is an explanatory diagram illustrating a configuration example of the addition lookup table according to the fourth embodiment of this invention.

FIG. 11B is an explanatory diagram illustrating a configuration example of the addition lookup table 264.

In the addition lookup table 264, N states (0 to N−1) of Σϕ(n−1) are indicated in the lateral direction, and N states (0 to N−1) of ϕ(n) are indicated in the longitudinal direction. Obtained addition results Σϕ(n) are written at intersections thereof. For example, even in the case of the phase division number N=16, the table size is 16 (longitudinal)×16 (lateral)×4 (bits) (16 states are stored)=1,024 bits. Thus, the small-size addition lookup table 264 can be realized.

In the conventional configuration illustrated in FIG. 5, if the adder circuit 248 is realized by a table, in the case of the addition of the internal 6 bits, the size of the table is 64 (longitudinal)×64 (lateral)×6 (bits)=24,576 bits. Further, in the case of using the addition of 8 bits, the size of 256 (longitudinal)×256 (lateral)×8 (bits)=524,288 bits is required. In this way, this invention largely reduces the size of the addition lookup table to 1/20 to 1/500, and enhances the operability of the integration circuit.

<Fifth Embodiment>

FIGS. 12A to 12D are explanatory diagrams illustrating examples of the signal constellation according to a fifth embodiment of this invention.

Figure 12A:
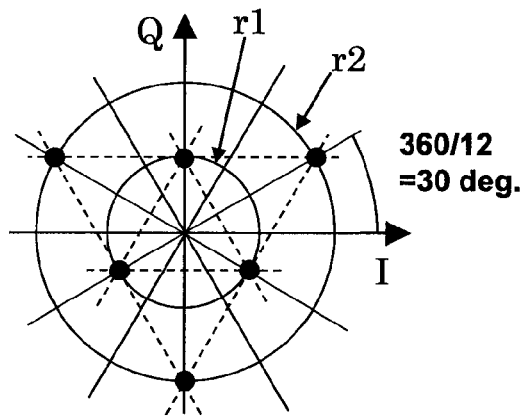
FIG. 12A is explanatory diagram illustrating an example of a signal constellation of a six-level signal according to a fifth embodiment of this invention.
Figure 12B:
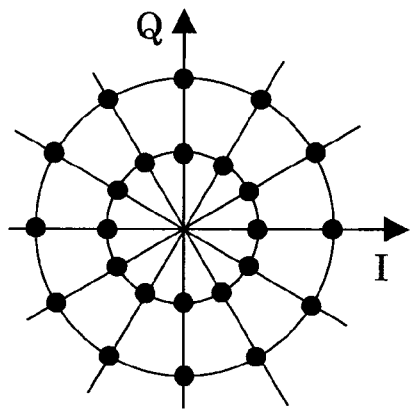
FIG. 12B is an explanatory diagram illustrating a signal constellation of phase pre-integrated six-level signal illustrated in FIG. 12A.
Figure 12C:
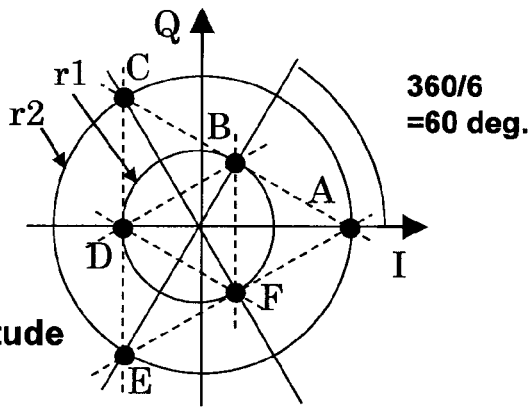
FIG. 12C is explanatory diagram illustrating another example of a signal constellation of a six-level signal according to the fifth embodiment of this invention.

FIGS. 12A and 12C each illustrate a multilevel signal of 6 levels (2 levels in the amplitude and 6 levels in the phase), and those signals have a relationship in which the signals are relatively rotated by 30 degrees. In the case of FIG. 12A, the respective signal points are constellated at positions at which the phase angles are integral multiples of 360/12=30° such as 30°, 90°, and 150°. As a result, the signal constellation after the phase pre-integration has 24 points in total, that is, the number of amplitudes M=2 and the number of phases N=12 as illustrated in FIG. 12B, which can thus be increased by four times.

Figure 12D:
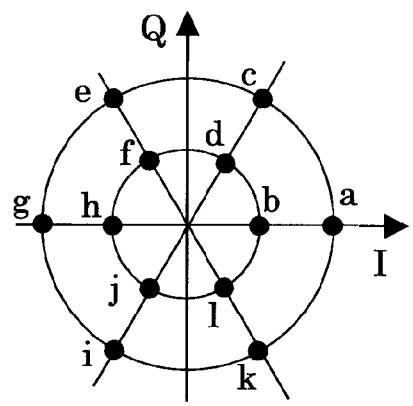
FIG. 12D is an explanatory diagram illustrating a signal constellation of phase pre-integrated six-level signal illustrated in FIG. 12C.

On the contrary, in the case of FIG. 12C, the signal points are constellated at positions at which the phase angles are integral multiples of 60° such as 0°, 60°, and 120°. For that reason, as illustrated in FIG. 12D, the signal constellation after the phase pre-integration can be suppressed to 12 points in total, that is, the number of amplitudes M=2 and the number of phases N=6.

In this way, according to the fifth embodiment, even in the same multilevel signal, the signal points after the phase pre-integration may be increased or decreased in number according to rotation in the phase direction. In reduction of the circuit scale, the constellation in which the phase division number N of the phase pre-integrated signal can be reduced is effective.

<Sixth Embodiment>

FIGS. 13A to 13D are explanatory diagrams illustrating examples of the signal constellation according to a sixth embodiment of this invention.

Figure 13A:
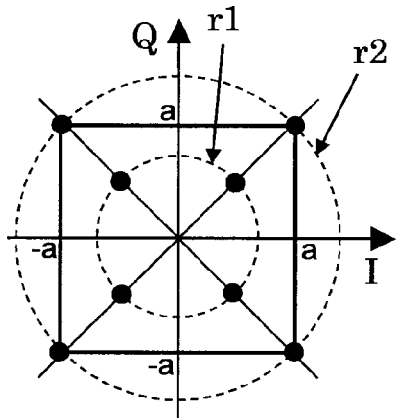
FIG. 13A is explanatory diagram illustrating an example of a signal constellation of an eight-level optical signal (8APSK signal) according to a sixth embodiment of this invention.

FIG. 13A illustrates a square area having each side 2*a* about an origin on the complex plane (area surrounded by four points (−a, −a), (−a, a), (a, a), (a, −a)). In FIG. 13A, eight signal points of an 8-APSK signal in which two-level amplitude modulation (amplitudes r1 and r2) is superimposed on four-level phase modulation are constellated. In this situation, when the signal constellation is rotated and arranged at an angle where signal points at the four corners match four vertexes of the square, the amplitude can be set to a maximum value in a state where the respective signal points are not outside the square area.

Figure 14A:
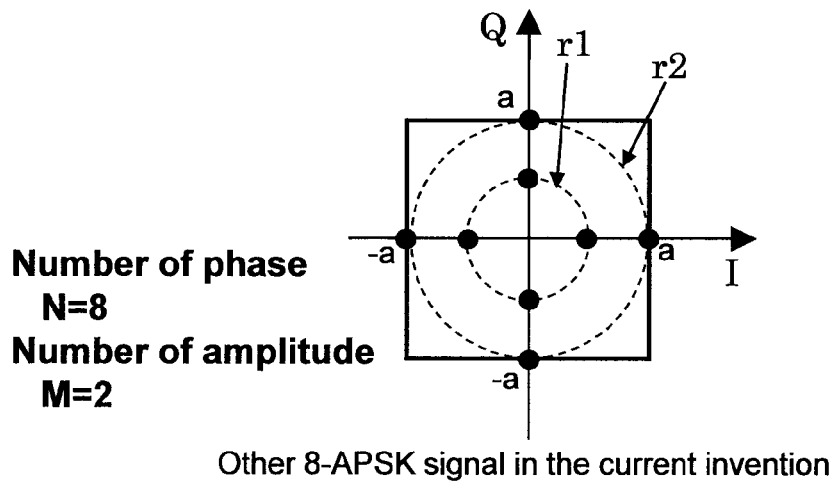
FIG. 14A is an explanatory diagram for illustrating another example of a signal constellation of a eight-level optical signal (8APSK signal).

On the other hand, FIG. 14A is an example in which the same eight-level signal constellation is displaced by 45 degrees from the state illustrated in FIG. 13A. FIG. 14A is a reference diagram that is not intended for this invention because FIG. 14A has the same number of signal points M×N as that of FIG. 14B illustrating the signal constellation after the phase pre-integration.

Figure 13B:
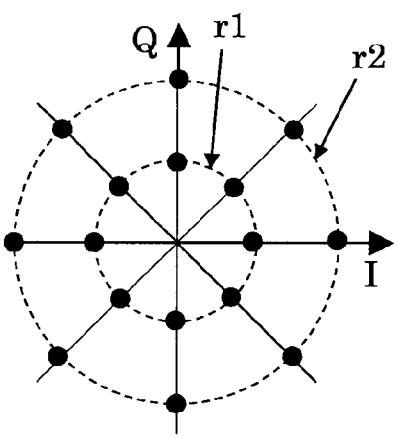
FIG. 13B is an explanatory diagram illustrating a signal constellation of phase a pre-integrated eight-level optical signal illustrated in FIG. 13A.
Figure 14B:
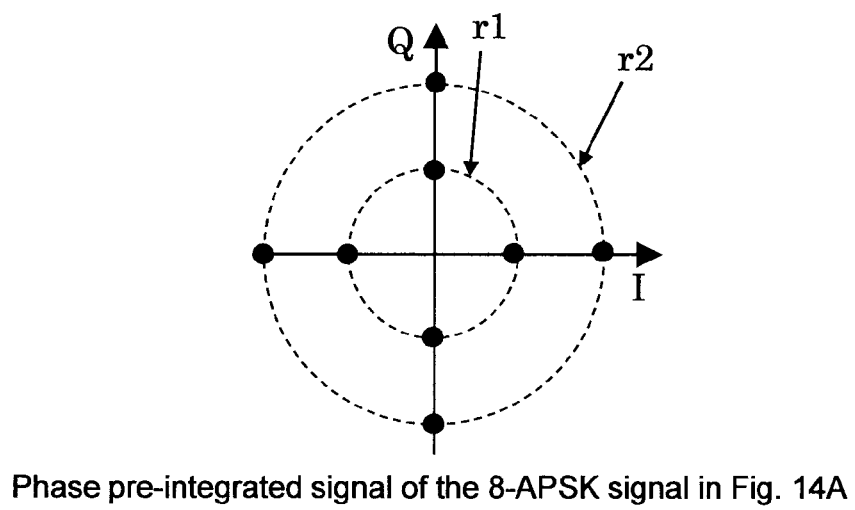
FIG. 14B is an explanatory diagram illustrating a signal constellation of phase a pre-integrated eight-level optical signal illustrated in FIG. 14A.

In the example of FIG. 14A, the amplitudes of the respective signal points are 1/sqrt(2) of FIG. 14B. FIGS. 13B and 14B are results of conducting the phase pre-integration processing in FIGS. 13A and 14A, respectively, and illustrate optical fields sent by the transmitter. When FIGS. 13B and 14B are compared with each other, FIG. 14B is smaller in the number of signal points and advantageous when considering only the circuit scale of the pre-integration processing.

On the other hand, the signal constellation obtained from the optical multilevel receiver used in this invention is illustrated in FIGS. 13A and 14A. In this case, two axes of I and Q correspond to output signals of two balanced receivers (224-1 and 224-2 of FIG. 8), and an upper limit a of the output range is determined according to the maximum intensity of light input to the balanced receiver and the conversion range of the AD converters (226-1 and 226-2 of FIG. 8). The electric noise of the optical balanced receiver can be relatively reduced as the amplitude of the signal is larger. Therefore, the signal constellation in which the amplitude becomes maximum in the square area as illustrated in FIG. 14A can further increase the optical signal intensity input to the receiver and further reduce the noise.

Figure 13C:
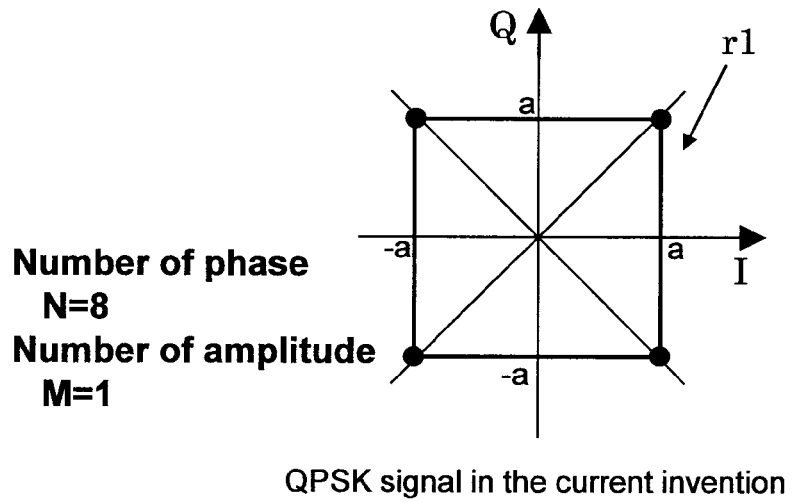
FIG. 13C is explanatory diagram illustrating another example of a signal constellation of a four-level optical signal (QPSK) according to the sixth embodiment of this invention.
Figure 13D:
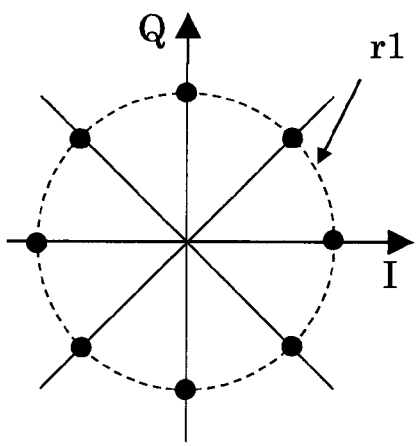
FIG. 13D is an explanatory diagram for illustrating a signal constellation of a phase pre-integrated four-level optical signal illustrated in FIG. 13C.

Further, FIG. 13C illustrates an example of four-level phase modulation in which the amplitude becomes maximum in the square area. FIG. 13D is results of conducting the phase pre-integration processing. Because the number of signal points is increased from 4 points to 8 points, it can be confirmed that FIG. 13D is intended for this invention. In this way, even in the simple four-level phase modulation, when applying this invention, the constellation in which the influence of the electric noise of the receiver is reduced can be realized with the maximum amplitude of the signal output from the receiver.

<Seventh Embodiment>

Figures 15A, 15B:
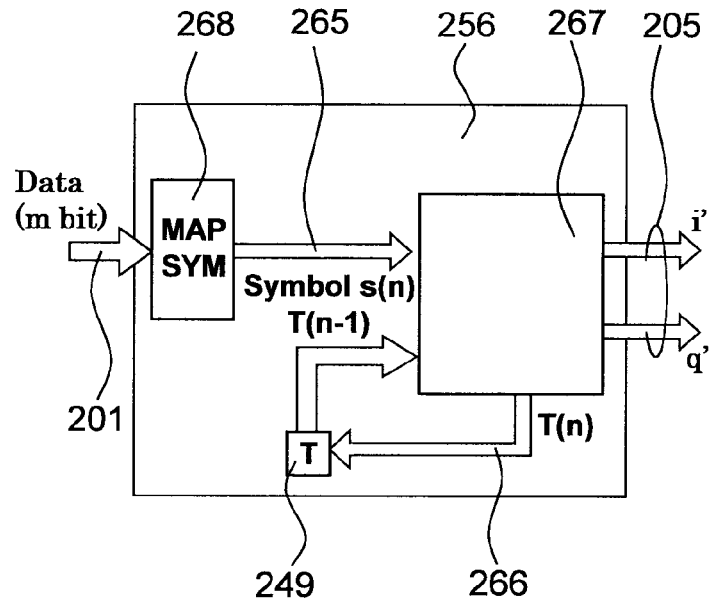
FIG. 15A is a block diagram illustrating a configuration of a phase pre-integration unit using a state transition table according to a seventh embodiment of this invention.
FIG. 15B is an explanatory diagram illustrating a configuration example of the state transition table according to the seventh embodiment of this invention.

FIG. 15A is a block diagram illustrating a configuration of a phase pre-integration unit 200 using a state transition table according to a seventh embodiment of this invention.

The seventh embodiment has a configuration in which transition between the symbols is managed by using a state transition table, and the hardware scale is greatly reduced by omission of the coordinate conversion.

A quadrature modulation circuit 256 according to the seventh embodiment illustrated in FIG. 15A receives an m-bit information signal from the digital information input terminal 201, and a complex multilevel symbol allocation circuit 268 outputs a symbol number 265 (s(n)) corresponding to the information signal. Instead of the symbol number, a logical symbol name or symbol may be allocated. For example, if a six-level signal illustrated in FIG. 12C is used, the output symbol names can be represented by six levels of A to F.

In the seventh embodiment, the symbols (phase integration symbols) of the phase integrated signal after phase integration are also managed by numbers or logical symbols, and the phase integration processing is realized by the state transition. Symbol numbers 266 (T(n)) of the phase integrated signal are signals of all of state (N×M) values that can be taken by the phase integrated signal. For example, if the six-level signal illustrated in FIG. 12C is used, the signal can be indicated by 12 levels of a to 1 of FIG. 12D.

A state transition and output table 267 receives the symbol number 265 (s(n)) of the input multilevel signal, and a phase integration symbol number (T(n−1)) obtained by delaying the phase integration symbol number 266 (T(n)) by one symbol time by the delay circuit 249.

A subsequent phase integration symbol number (corresponding to the operation result of the "modulo N" addition) and the Cartesian coordinates of the phase integration symbol, which is an output signal, can be obtained at the same time by searching the state transition and output table 267 on the basis of those input signals.

FIG. 15B is an explanatory diagram illustrating a specific configuration example of the state transition and output table 267.

The state transition and output table 267 illustrated in FIG. 15B illustrates a case using a six-level signal illustrated in FIG. 12C. In FIG. 15B, six states (A to F) that can be taken by the symbol number (s(n)) of the input multilevel signal are represented in the longitudinal direction, and 12 states (a to l) that can be taken by the symbol number (T(n−1)) of the current phase pre-integrated signal is represented in the lateral direction. Further, at each intersection of the table, the symbol number (T(n)) of the subsequent phase pre-integrated signal and the Cartesian coordinate values I and Q of T(n) are described.

Hence, if the table is searched once, the phase pre-integration processing and the Cartesian coordinate transform of the output signal can be easily realized. Because the number of bits necessary for managing 12 symbol numbers is 4 bits, the required table size is also sufficiently small, that is, 6 (longitudinal)×12 (lateral)×(4 bits+coordinate 6 bits×2)=1,152 bits.

In the above-mentioned example, all the symbol transitions of the phase pre-integrated signal are managed by one state transition table. Alternatively, only the phase transition may be managed. In this case, the number of states may be set to the same number of N as the phase division number, and the size of the state transition table can be appropriately reduced.

What is claimed is:

1. An optical field transmitter comprising:
   a light source;
   one or more DA converters;
   an optical field modulator;
   a complex information multilevel signal generator circuit that converts an information signal of a plurality of bits input at given time intervals into a complex multilevel information signal to output the complex multilevel information signal; and
   a phase pre-integration circuit that receives the complex multilevel information signal output from the complex information multilevel signal generator circuit and sampled at the given time intervals, and outputs phase pre-integration complex information obtained by integrating a phase component of the complex multilevel information signal by a given time interval in advance;
   wherein the one or more DA converters each convert the complex multilevel information signal including the phase pre-integration complex information output from the phase pre-integration circuit into an analog signal, and outputs the converted analog signal to the optical field modulator,
   wherein the optical field modulator modulates light output from the light source into a optical field signal by using the analog signal, and transmits the modulated optical field signal,
   wherein a phase angle of the complex multilevel information signal at a complex signal point is any one of values of integral multiples obtained by dividing 360 degrees by a positive integer N,
   wherein an amplitude value of the complex multilevel information signal at the complex signal point is any one of values of a positive integer M, and wherein a total number of the complex signal points that the complex multilevel information signal may take is lower than a product of N and M.

2. The optical field transmitter according to claim 1, wherein the phase pre-integration circuit includes a "modulo N" addition circuit.

3. The optical field transmitter according to claim 2, wherein the "modulo N" addition circuit includes an N-value counter or an N-bit shift register that receives N-level phase information, and
wherein the "modulo N" addition circuit outputs N-level phase information.

4. The optical field transmitter according to claim 2, wherein the "modulo N" addition circuit is implemented on a memory circuit.

5. The optical field transmitter according to claim 1, wherein the complex information multilevel signal generator circuit separates the complex multilevel information signal into an amplitude component and the phase component and outputs the separated amplitude component and the separated phase component,
wherein the separated amplitude component is any one of M levels, and
wherein the separated phase component is any one of N levels, which are arranged at regular spacings.

6. The optical field transmitter according to claim 1, further comprising a quadrature modulation circuit that receives a signal of an amplitude component with M or lower levels and a signal of the phase component with N or lower levels, which is output from the phase pre-integration circuit, and outputs a signal transformed into complex Cartesian coordinates having an amplitude and a phase angle indicated by the input signal of the amplitude component and the input signal of the phase component.

7. The optical field transmitter according to claim 1, wherein the phase pre-integration circuit includes a state transition table with N states, which gives N phase values of the complex multilevel information signal after the phase pre-integration in response to N phases of the complex multilevel information signal.

8. The optical field transmitter according to claim 1, wherein the phase pre-integration circuit includes a state transition table with N×M states, which gives symbol information of the complex multilevel information signal after the phase pre-integration in response to symbol information of the complex multilevel information signal.

9. The optical field transmitter according to claim 1, wherein the complex information multilevel signal generator circuit constellates complex signal points at rotation angles where amplitudes of signal points become maximum in a square that defines given ranges of a real part and an imaginary part on a complex plane.

10. An optical transmission system comprising:
an optical field receiver; and
an optical field transmitter,
wherein the optical field transmitter includes:
a light source;
one or more DA converters;
an optical field modulator;
a complex information multilevel signal generator circuit; and
a phase pre-integration circuit,
wherein the complex information multilevel signal generator circuit converts an information signal of a plurality of bits input at given time intervals into a complex multilevel information signal to output the complex multilevel information signal,
where the phase pre-integration circuit receives the complex multilevel information signal output from the complex information multilevel signal generator circuit and sampled at the given time intervals, and outputs phase pre-integration complex information obtained by integrating a phase component of the complex multilevel information signal by a given time interval in advance,
wherein the one or more DA converters each convert the complex multilevel information signal including the phase pre-integration complex information output from the phase pre-integration circuit into an analog signal, and outputs the converted analog signal to the optical field modulator,
wherein the optical field modulator modulates light output from the light source into a optical field signal by using the analog signal, and transmits the modulated optical field signal,
wherein a phase angle of the complex multilevel information signal at a complex signal point is any one of values of integral multiples obtained by dividing 360 degrees by a positive integer N,
wherein an amplitude value of the complex multilevel information signal at the complex signal point is any one of values of a positive integer M,
wherein a total number of the complex signal points that the complex multilevel information signal may take is lower than a product of N and M,
wherein the optical field receiver includes:
an optical splitter;
two or more optical delay detection receivers different in interference phase from each other by a given delay amount;
two or more AD converters; and
a digital phase processing circuit,
wherein the optical field receiver receives a phase pre-integrated optical field signal output from the optical field transmitter,
wherein the optical splitter splits the received optical field signal into at least two optical field signals,
wherein the plurality of optical delay detection receivers receive the split optical field signals at the same time,
wherein the two or more AD converters each convert signals output from the plurality of optical delay detection receivers into respective digital signals, and
wherein the digital phase processing circuit calculates a differential phase between a received complex optical field signal and a previously received complex optical field signal.

11. The optical transmission system according to claim 10, wherein the phase pre-integration circuit includes a "modulo N" addition circuit.

12. The optical transmission system according to claim 11, wherein the "modulo N" addition circuit includes an N-value counter or an N-bit shift register that receives N-level phase information, and
wherein the "modulo N" addition circuit outputs N-level phase information.

13. The optical transmission system according to claim 11, wherein the "modulo N" addition circuit is implemented on a memory circuit.

14. The optical transmission system according to claim 10, wherein the complex information multilevel signal generator circuit separates the complex multilevel information signal into an amplitude component and a phase component and outputs the separated amplitude component and the separated phase component, wherein the separated amplitude component is any one of M levels, and wherein the separated phase component is any one of N levels, which are arranged at regular spacings.

15. The optical transmission system according to claim 10, further comprising a quadrature modulation circuit that receives a signal of the amplitude component with M or lower levels and a signal of the phase component with N or lower levels, which is output from the phase pre-integration circuit, and outputs a signal transformed into complex Cartesian coordinates having an amplitude and a phase angle indicated by the input signal.

16. The optical transmission system according to claim 10, wherein the phase pre-integration circuit includes a state transition table with N states, which gives N phase values of the complex multilevel information signal after the phase pre-integration in response to N phases of the complex multilevel information signal.

17. The optical transmission system according to claim 10, wherein the phase pre-integration circuit includes a state transition table with N×M states, which gives symbol information of the complex multilevel information signal after the phase pre-integration in response to symbol information of the complex multilevel information signal.

18. The optical transmission system according to claim 10, wherein the complex information multilevel signal generator circuit constellates complex signal points at rotation angles where amplitudes of signal points become maximum in a square that defines given ranges of a real part and an imaginary part on a complex plane.

* * * * *